Dec. 24, 1968      L. NEMES      3,417,727
PRESSURE RESPONSIVE SIGNAL AND INDICATOR
Filed Jan. 27, 1967      4 Sheets-Sheet 1
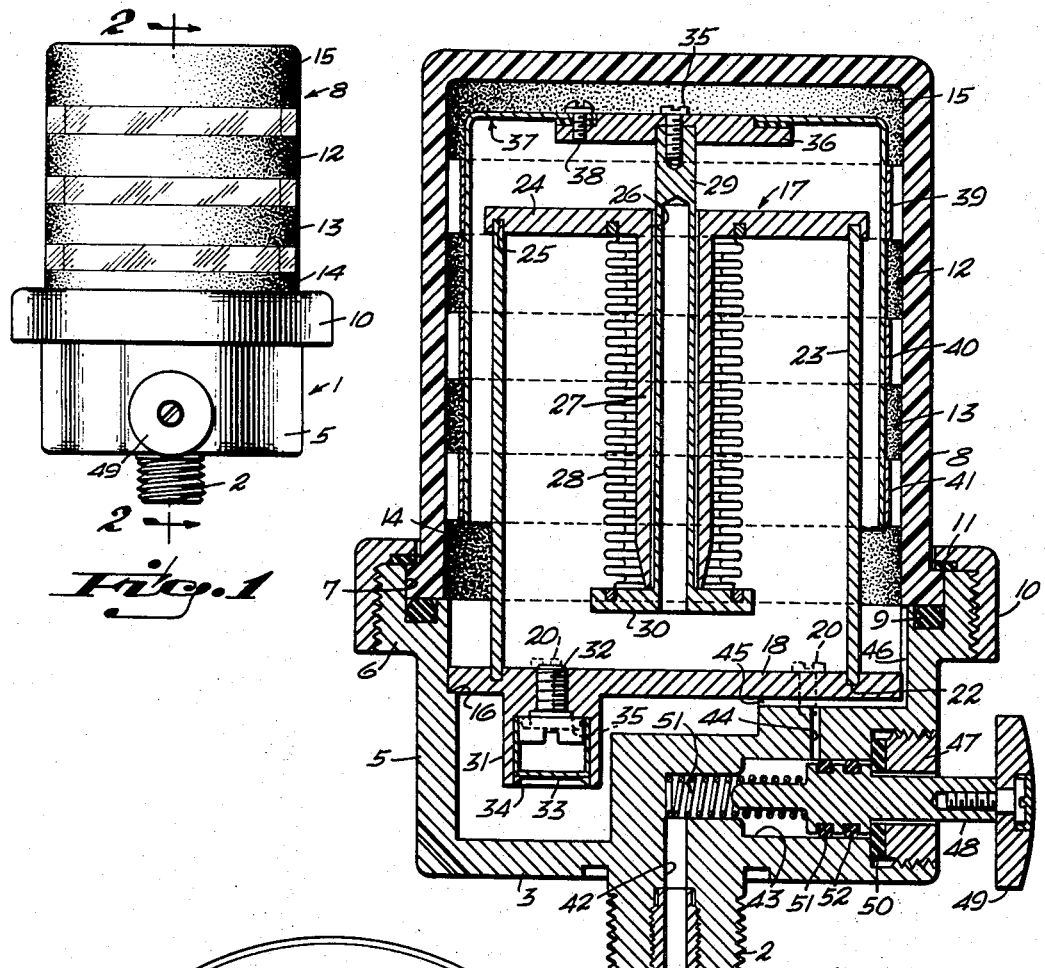
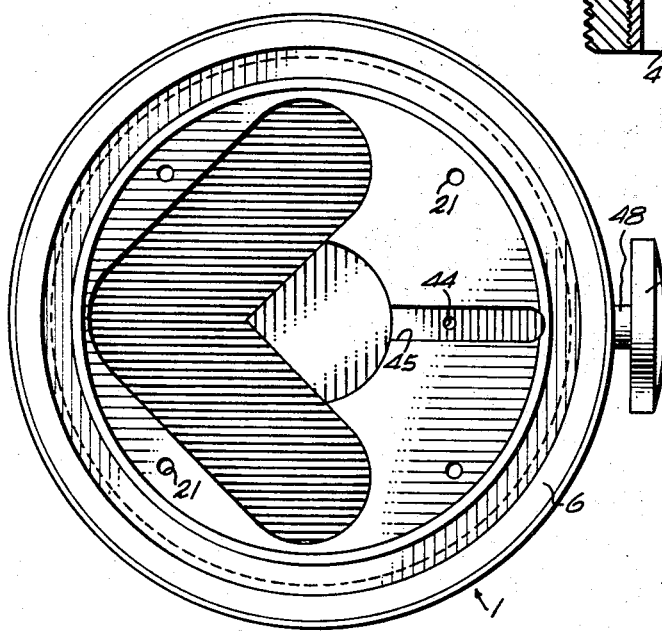
INVENTOR.
LASZLO NEMES
BY
ATTORNEY.

Dec. 24, 1968 L. NEMES 3,417,727
PRESSURE RESPONSIVE SIGNAL AND INDICATOR
Filed Jan. 27, 1967 4 Sheets-Sheet 2
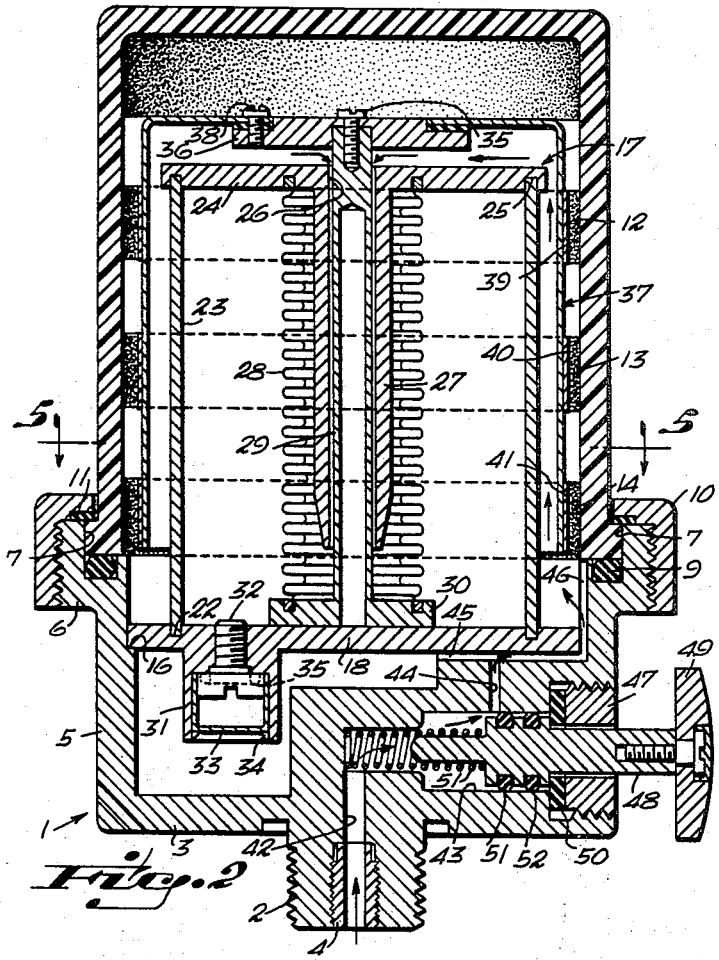
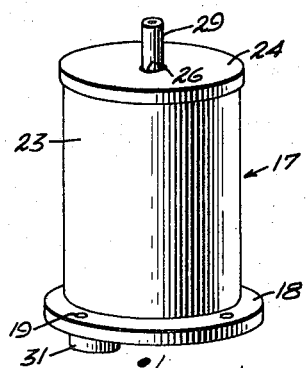
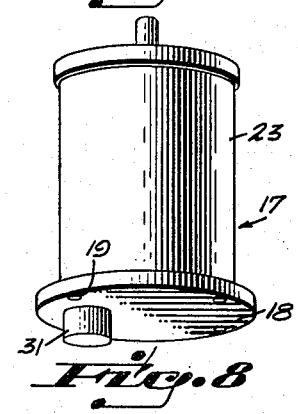
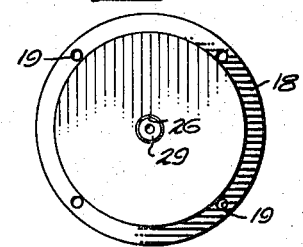
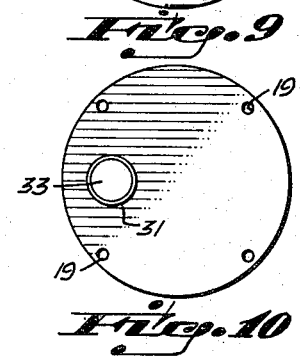
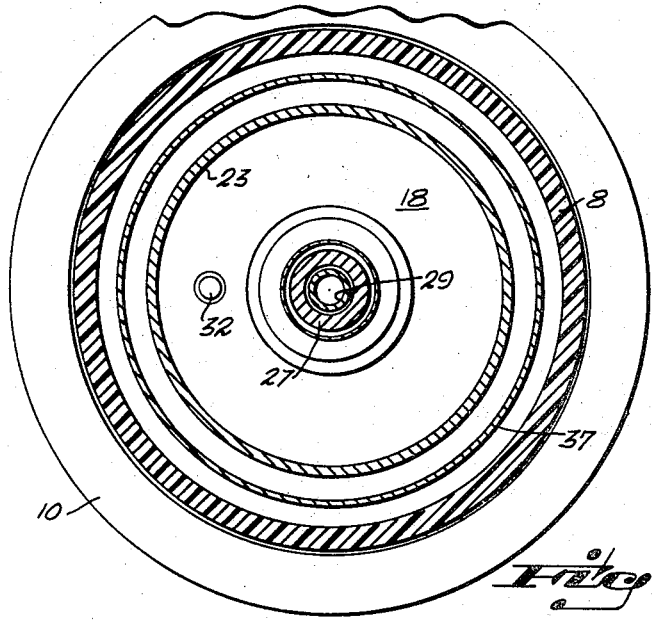
INVENTOR.
LASZLO NEMES
BY John Cyril Malloy
ATTORNEY.

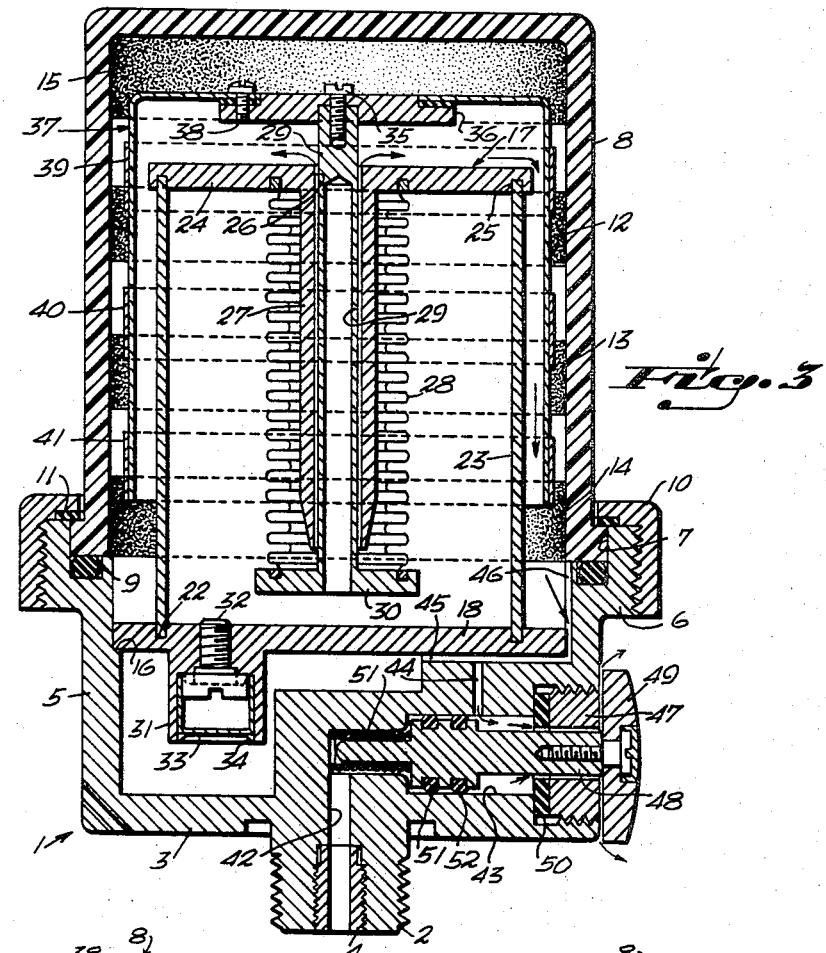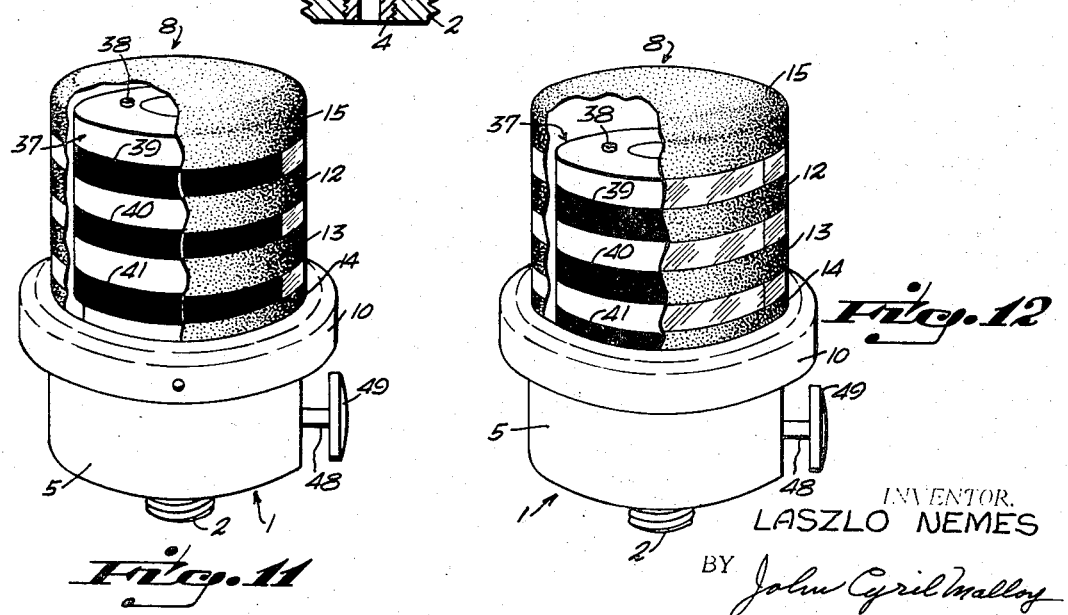

Dec. 24, 1968  L. NEMES  3,417,727
PRESSURE RESPONSIVE SIGNAL AND INDICATOR
Filed Jan. 27, 1967

INVENTOR.
LASZLO NEMES
BY John Cyril Malloy
ATTORNEY.

United States Patent Office 3,417,727
Patented Dec. 24, 1968

3,417,727
PRESSURE RESPONSIVE SIGNAL
AND INDICATOR
Laszlo Nemes, 700 Kennedy Blvd. E.,
Weehawken, N.J. 07087
Filed Jan. 27, 1967, Ser. No. 612,199
13 Claims. (Cl. 116—70)

ABSTRACT OF THE DISCLOSURE

An instrument for detection and indication of small changes of pressure in a closed system, embodying a unitized sealed pressure capsule having a bellows as a wall portion thereof. The capsule is enclosed in a pressure-tight casing in communication with the system and has indicator means in the casing directly connected with the bellows.

---

This invention relates to pressure-responsive signal and indicator device.

In Patent No. 3,221,703, granted Dec. 7, 1965, there is disclosed a similar device of general utility in connection with the detection and indication of small changes in pressure within the hollow rotor blades of a helicopter. It is customary to make these blades hollow and to pressurize them with a gas at relatively low gage pressure. Since an incipient break or fissure in a blade can rapidly enlarge and lead to failure of the rotor, it is important to detect such incipient cracks or fissures before they have time to develop to dangerous size. The invention disclosed in the above-identified patent provides an instrument which is permanently connected into the pressurized system of the rotor, and which responds to a very small decrease in pressure therein to give an unmistakable visual signal or indication that such an incipient break exists within the rotor, so that the craft may be taken out of service for repair.

The patent above identified accomplishes the desired result in a highly satisfactory manner, by providing an instrument incorporating a closed or sealed compartment of small volume, having as one wall thereof a flexible expansible bellows or Sylphon. The bellows is directly connected with an indicator and the sealed compartment is enclosed within a chamber in communication with the pressurized system of the helicopter rotor. The pressure in the sealed compartment and the closed pressurized system are normally balanced or in equilibrium at the usual operating pressure of the system. Since the volume of this system is large in comparison with that of the sealed compartment, a small drop in pressure in the system, such as is caused by an incipient break or fissure in a rotor blade, effects a relatively large change in volume of the sealed compartment. This change is used to cause a correspondingly large movement of the indicator or signal means, to unmistakably warn of possible breakage of the blade and the necessity for inspector and repair. The sensitivity of the instrument is enhanced by directly attaching the indicator means to the expansible wall of the bellows of the sealed chamber and enclosing it within a casing in communication with the pressurized system, so that no bearings or packing glands are required and the friction which would otherwise be introduced, is avoided.

The present invention is an improvement over the construction disclosed in the aforesaid patent; and while for clarity of description it will be described in cvonnection with the signaling or indication of small pressure drop or change within a helicopter rotor blade, it will be understood that the invention has a wide range of utility in many arts where the indication of change from a desired or predetermined pressure is necessary or desirable.

It is the chief object of the invention to provide an instrument responsive to and distinctly indicating and signaling, small changes in pressure from a desired or normal value, within a closed pressurized system.

Another object is to provide an instrument as in the preceding paragraph, which embodies and relies for operation upon a sealed unitary capsule device.

Still another object is to provide an instrument as aforesaid, wherein the capsule device may be prefabricated, pressurized and assembled with the remainder of the instrument.

Another object is to provide an instrument of the type stated, of great versatility because of the fact that the capsule is interchangeable as desired, for any selected one of other capsules of like construction, each having different operating characteristics such as normal internal pressure and spring rate.

Yet another object is to provide an instrument as stated, which is extremely sensitive to small changes from a known normal value of pressure within a closed system, and which affords an unmistakable visual signal of such changes.

Ancillary to the immediately foregoing object, it is a further object to provide an instrument wherein the sensitivity is enhanced by freedom from friction of the indicating element and its connection with the capsule.

Another object is to provide an instrument which embodies simplified means, manually operable to give a positive indication that the instrument is operating properly, or will operate properly for its desired purpose.

Another object is to provide an instrument of the type aforesaid which is compact, rugged, reliable over long periods of use, and, particularly because of the ease of removal and replacement of its capsule or sensitive element, easily serviced and repaired.

Still another object is to provide a novel capsule structure which is capable of prefabrication and pressurization, and subsequent assembly with the remaining parts, to form a complete instrument.

Other objects and advantages will become clear to those skilled in the art, after a study of the following detailed description, in connection with the accompanying drawing.

In the drawing:

FIGURE 1 is an elevational view of the assembled instrument, looking from the right, FIGURE 4, and showing the appearance of the indicator under normal operating conditions;

FIGURE 2 is a vertical axial section to an enlarged scale, taken in a plane identified by line 2—2, FIGURE 1, and showing the parts in positions of normal operation;

FIGURE 3 is a sectional view like FIGURE 2, but showing the parts in the positions they assume in response to a certain reduced pressure exteriorly of the capsule;

FIGURE 4 is a sectional view corresponding to FIGURES 2 and 3, but showing the parts in the positions they assume in maximum permissible motion of reduced pressure indication;

FIGURE 5 is a view in transverse section, taken in a plane about as identified by line 5—5, FIGURE 2;

FIGURE 6 is a top plan view of the base cup, to the same scale as FIGURES 2, 3 and 4, the sensitive element or capsule, indicator, and closure cap being removed;

FIGURE 7 is a perspective view to a reduced scale, of the assembled capsule as seen from a point above the level of the top end thereof;

FIGURE 8 is a perspective view of the capsule from a point below the level of the bottom thereof, and to the same scale as FIGURE 7;

FIGURE 9 is a top plan view of the capsule;

FIGURE 10 is a bottom plan view of the capsule;

FIGURE 11 is a perspective view of the assembled device as it appears when indicating a predetermined pressure drop from normal within the closed rotor system, a part of the transparent cap being broken away;

FIGURE 12 is a perspective view corresponding to FIGURE 11, but showing the instrument as it appears when indicating normal or safe operating conditions.

Figure 13:
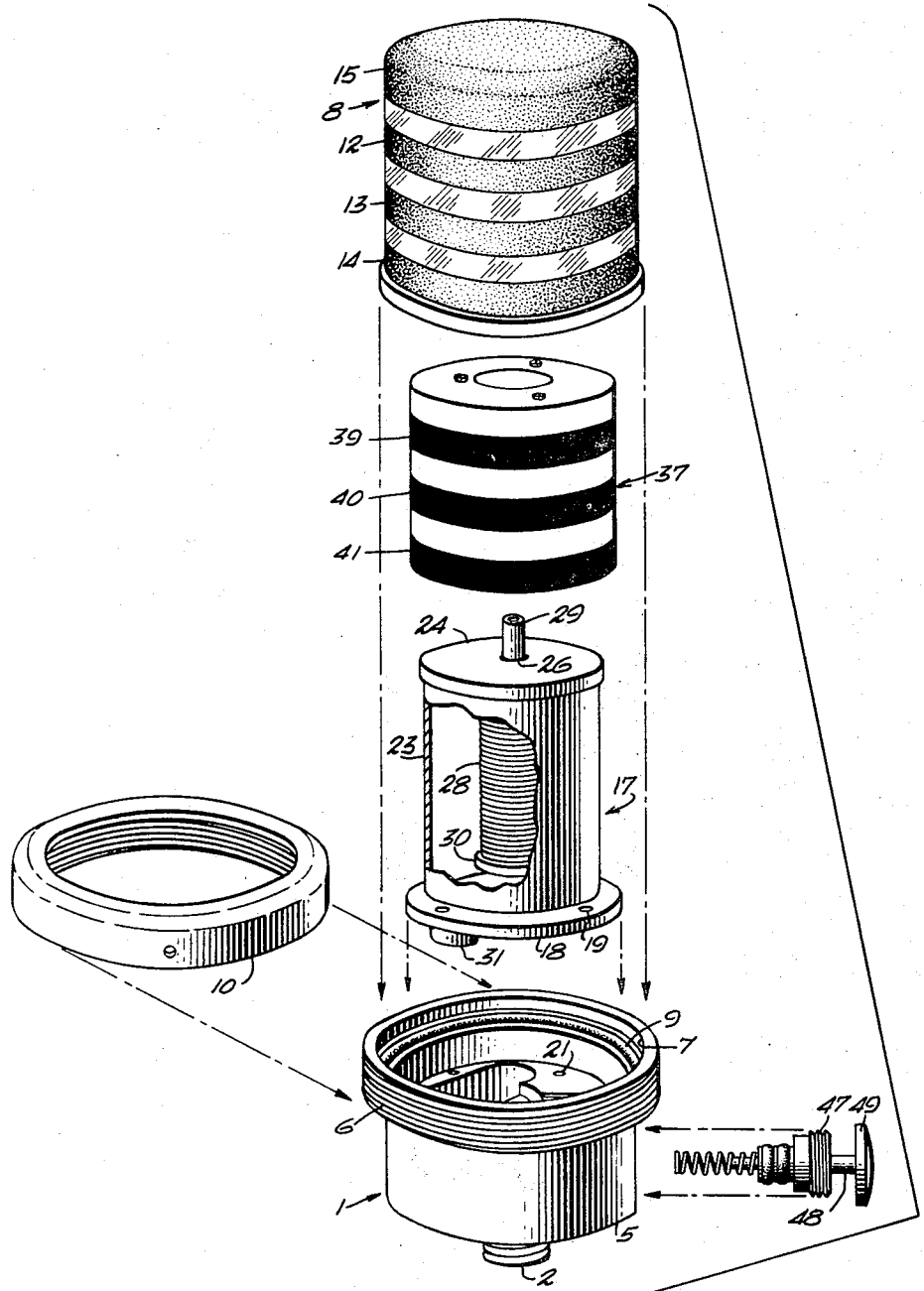
FIGURE 13 is an exploded view of the component parts, the wall of the capsule being broken away to show the Sylphon enclosed therein.

Referring in detail to the drawing, a base cup 1 has a pressure connection or nipple 2 extending centrally from its generally circular base or bottom wall 3. A soft-metal insert sleeve 4 assures pressure tight connection with the pressurized system, not shown. The cup includes side wall 5 and an outwardly-flanged threaded rim 6. The upwardly-facing rim portion of cup 1 is counterbored at 7 to form a circular channel. Inverted cap 8 is of transparent shatter-proof material and has its lower end outwardly flanged and sized for a smooth fit within the counterbore of the flange of cup 1. An O-ring 9 rests in the aforesaid channel and is compressed to effect a pressure-tight seal between the cup and cap, when flanged ring 10 is turned down on the threads of rim 6. A washer 11 seats in a counterbore in the inner surface of the flange of the ring 10 and assures that the flanged rim of the cap compresses O-ring 9.

Cap 8 is generally cylindrical, with a closed top. The inside surface of the cap carries a number of axially-spaced indicator rings 12, 13, 14. These rings or bands are of a distinctive color and may be formed in any suitable way, as by adhesive strips of material, paint, or sandblasting the surface of the cap to render the ring areas translucent or pellucid, in contrast with the areas interposed between the rings. Likewise the top end wall of the cap and areas adjacent thereto may be similarly colored or roughened as indicated at 15.

Adjacent the top of its inner wall, cup 1 is formed with an upwardly-facing circular shoulder 16. The circular metallic base plate 18 of the capsule generally identified at 17, is sized for a smooth fit to rest upon this shoulder and to which it is attached by means of four screws 20 passing through holes 19 therein, FIGURES 7 through 10 and 13, and threaded into holes 21 in the bottom wall of the cup. See FIGURE 6. Plate 18 is provided on its upper face, with a circular channel 22 receiving with a snug fit the lower end of metallic cylindrical wall 23 forming a part of the capsule. The two are secured together in a pressure-tight joint, as by soldering, brazing or welding. At its top, wall 23 is capped by a plate 24 of lesser diameter than base plate 18 but similarly provided with a circular channel 25 receiving the edge of the wall and attached thereto in a pressure-tight joint. Plate 24 has a central opening 26 surrounded by an integral depending stop tube 27 conveniently tapered at its lower end. A light flexible bellows or Sylphon 28 surrounds stop tube 27. Its upper end is attached in a pressure-tight seal with the lower surface of wall or plate 24. Its lower end is similarly attached in a pressure-tight seal, to the lower circular flanged end 30 of a stem 29 extending with a loose fit upwardly in and along tube 27 and projecting through opening 26. See FIGURES 7 and 8 in particular Thus plate 18, cylindrical wall 23, top plate 24 and bellows 28 conjointly form a closed chamber of variable volume as Sylphon 28 contracts and expands. FIGURE 2 shows this chamber at minimum permissible volume as limited by contact between flange 30 and base plate 18. FIGURE 4 shows the chamber at maximum permissible volume when flange 30 rises and contacts the lower end of tube 27. FIGURE 3 shows a position of the parts about midway between the positions of FIGURES 2 and 4.

The chamber is pressurized with a suitable gas, through an opening in plate 18. Referring in particular to FIGURE 2, the plate is formed with a protuberance 31 depending from its lower surface and having a threaded opening which is counterbored to receive the shank and head of closure screw 32. The screw is backed off and after the chamber has been pressurized to the desired measured value, is turned down. A gasket 35 in a channel in the head of the screw assures a pressure-tight seal. Sealing is completed by a cap 33 which has a snug fit within the counterbore and as shown, encompasses the head of the screw. The joint between the cap and counterbore is then closed by soldering, brazing or welding, as indicated at 34, FIGURES 3 and 4. It is noted that the capsule is a unitary discrete item which is separately fabricated, pressurized, and then assembled with the remaining parts of the instrument. Stem 29 is hollow as shown, to reduce weight and to correspondingly reduce to a minimum the inertia of the indicating moving parts.

The upper end of stem 29 is axially drilled and tapped to receive a screw 35 which secures a disk 36. The disk is counterbored to receive the upper end of the stem with a smooth fit. The disk is relieved at the perimeter of its upper surface, to accommodate an opening in the top of an indicator element in the general shape of an inverted cup and generally identified at 37. The indicator and disk are fixed together by machine screws 38 as clearly shown upon FIGURES 2, 3 and 4. See also FIGURE 13. The skirt or depending portion of the indicator passes freely between cylindrical wall 23 of the capsule, and cap 8, and carries on its outer surface a number of axially-spaced indicator rings 39, 40 and 41 which are of a color or appearance contrasting vividly with that of rings 12, 13 and 14 on cap 8, as previously described. See FIGURE 12. The areas of the skirt between these bands or rings may be of the same color or appearance as rings 12, 13, etc. All rings are preferably of the same axial width and spacing, and the construction and arrangement are such that when indicator 37 is in its uppermost limiting position as shown at FIGURE 4, rings 39, 40 and 41 are in full view, each between two contiguous opaque rings 12, 13, etc., carried by cap 8, to thus present a striking appearance of alternate rings of contrasting color, such as black and white. To enhance the appearance thus presented, rings 12, 13 and 14 may be dull and light-absorbing while rings 39, 40, 41 may be bright, polished and light-reflecting.

When the enclosed volume of the capsule is at its permissible minimum as illustrated at FIGURE 2, each ring 39, 40, etc. is concealed behind a respective one of the opaque rings on cap 8 and thus present an appearance which is unmistakably different from the one displayed when the parts are in the position of FIGURE 4. It will be noted therefore, that, referring to FIGURE 2, the distance between the top surface of flange 30 and the lower end of tube 27, is equal to the width or axial dimension of each of the rings and the spacing between two contiguous rings.

In the present invention the arrangement and construction are such that the exterior of the bellows or Sylphon 28 is subjected to the standard or reference pressure within the capsule, while the interior thereof is subjected to that of the pressurized system such as that within the hollow rotor blades of a helicopter. For this purpose the central bore in nipple 2 communicates with a radial bore 43 in a thickened interior and integral portion of base cup 1. Referring in particular to FIGURES 4 and 6, when the instrument is in normal or operating condition, pressure in the rotor system is effective through a drilled passage 44 leading from bore 43 to a channel 45 extending radially in the top surface of the thickened portion of the cup, and capped or covered by base plate 18 of the capsule. From the radially outward end of this channel, the pressure conduit extends along a longitudinal channel 46 formed in the side wall of the cup, past plate 18, to the annular space between wall 23 and indicator 37, upwardly over and radially inwardly across top wall 24 of the capsule, and downwardly in the space between tube 27 and stem 29, to the interior of the Slyphon.

As explained in the patent previously identified, it is desirable to be able to test the instrument periodically to assure that it is operating properly. For this purpose radial bore 43 is counterbored and threaded at its outward end, to receive a gland nut 47 centrally drilled to accommodate with clearance, a valve stem 48 having knob 49 detachably fixed to its exposed end. A washer 50 is interposed about the stem, between nut 47 and the shoulder formed by the counterbore of bore 43. Within the bore, stem 48 is cylindrically enlarged and circumferentially grooved to form two axially-spaced channels for seating respective O-rings 51, 52 and forming with the wall of the bore, a seal against the escape to ambient air, of gas within the pressurized rotor system when the stem is yieldingly urged to the position shown upon FIGURES 2 and 4. For this purpose a coil spring 51 extends between the inner reduced end of the stem and the end of the bore, in a way clear from inspection of FIGURE 2. When the stem is manually pressed inwardly, that is, to the left as seen in FIGURE 3, until the reduced end of the stem abuts the end of the bore, the O-rings are located at the left of passage 44. Thereby, communication between the pressurized system and the interior of the Sylphon is cut off and connection made with atmosphere through channels 46, 45, passage 44, and about the reduced outer end of stem 48. Assuming that the instrument is operating properly and that the rotor system is at proper gage pressure, movement of valve stem 48 as aforesaid, releases pressure within Sylphon 28. The confined gas within the capsule, exteriorly of the Sylphon then expands and moves indicator 37 from the limiting position of FIGURE 2 to the limiting position of FIGURE 4, and thus affords positive indication that the instrument is in proper operating condition. When force is removed from knob 49, spring 51 restores the parts to the position shown, wherein the instrument is cut off from atmosphere and reconnected with the pressurized rotor system.

The operation will be clear from the foregoing description. Under normal operation the relation of the pressure in the rotor blades or other closed system, and that in the capsule, is such that the Sylphon is expanded to the permissible limit so that the flanged end of stem 29 is in contact with base plate 18. A clear indication is thus afforded of the absence of leakage, or leakage above an acceptable rate, from the pressurized system. When and if an incipient break or fissure occurs in a blade of the rotor, gas escapes therethrough at an above-normal rate and effects a corresponding reduced pressure in the system. The resulting reduced pressure within cap 8, exteriorly of capsule 17 and interiorly of Sylphon 28 results in expansion of the gas confined within the capsule. Resulting contraction of the Sylphon elevates stem 29 to a position which will depend upon the rate of leakage up to the maximum distance shown upon FIGURE 4, wherein an unmistakable signal or alert is presented by the alternate bands of contrasting colors. Moreover, in the particular use given, the pilot is able to judge the general rate of leakage from the system, above normal and up to the danger point, by noting the width of the visible portions of bands 39, etc. FIGURE 3 shows one such position wherein bands 39, 40, 41 are only partially visible, thus signaling an alert for a possible break. FIGURES 11 and 12 show, respectively, the signaling of a potentially dangerous leakage, and normal operating conditions.

Many other uses for and adaptations of the invention, will readily occur to those skilled in the art. For example, the instrument is equally capable of use to indicate or signal a rise in pressure above a normal or predetermined value in a closed system. If FIGURES 4 and 11 are assumed to show the normal condition wherein pressure in capsule 17 is balanced with surrounding pressure in cap 8 and within Sylphon 28, then an increase of pressure in the system will cause the Sylphon to expand and move indicator 37 downwardly to the permissible maximum shown upon FIGURES 2 and 12, or to some intermediate point as shown upon FIGURE 3, depending upon the increase in pressure within the system. In such case, of course, the rings or bands on either cap 8 or indicator 37 would probably be interchanged to give an unmistakable visual signal of a predetermined rise above normal of the pressure within the system. The testing means embodied in valve 48 etc., previously described, could then be replaced by a manually operable pump such as a small piston pump connectable with bore 44 to increase pressure within the bellows, and at the same time to cut off communication between the system and the instrument. If the parts moved to the position of FIGURE 2 it would be known that the instrument is in proper operating condition.

One of the great advantages of the present invention is that the capsule element is a complete and unitary item in itself. It may be separately manufactured and pressurized and then assembled with base cup 1 and cap 8. The capsule may be manufactured and supplied with different normal internal pressures and Sylphons of different spring rates; and each may be easily positioned within the casing in substitution for others. Thereby the instrument may be adapted for different conditions of use and responsive to different values of pressure change from the normal or desired pressure. Obviously too, the instrument is easily serviced by replacement of a defective capsule with a new one. Due to the fact that the pressure variation within a closed system is compared with a constant standard reference pressure within the capsule, the instrument operates independently of changes in barometric pressure such as those resulting from change in altitude.

The disclosure is therefore to be taken in an illustrative rather than a limiting sense; and all changes of shape, size, proportions, and substitutions of equivalents within the scope of the subjoined claims, are reserved. For instance, as is apparent from the proceding discussion, the rings or bands on either cap 8 or indicator 37 may be arranged relative to one another such that, if there is a loss of pressure in the capsule, as by damage, the device will automatically provide an unsafe condition signal; i.e., if the flange 30 is in contact with the base of the capsule, the position shown in FIGURE 2, an unsafe condition will be signalled and this is the preferred embodiment for use on helicopters.

Having fully disclosed the invention, what I claim and desire to secure by Letters Patent is:

1. A pressure responsive indicator and signaling instrument comprising a pressure-tight casing having a transparent viewing portion and including means for connecting said casing in fluid pressure communication with a closed system normally pressurized to a predetermined value, self-contained discrete capsule means separable as a unit from and detachably mounted in said casing and forming a pressure-tight chamber independently of said casing, one wall portion of said chamber having an opening therethrough, an expansible member sealing said opening and subject to pressure extent in said casing, said chamber being pressurized to a predetermined value with respect to the normal operating pressure in said casing, indicator means in said casing, and means operatively connecting said indicator means to said expansible member, for direct actuation by flexure thereof, said indicator means being viewable through said transparent viewing portion.

2. The instrument of claim 1, said expansible member comprising a Sylphon having one end secured to said wall portion about and sealing said opening, and extending within said chamber, and means within said chamber, discrete from and independent of said casing, and closing and sealing the other end of said Sylphon.

3. The instrument of claim 2, said indicator means including a stem independent of said casing and extending in and coaxially along said Sylphon, to the exterior of said capsule, through said opening, said last-named means comprising a flange fixed with the lower end of said stem and to which said other end of said Sylphon is sealingly attached.

4. The instrument of claim 3, said stem contacting one wall portion of said capsule to limit expansion of said Sylphon, and stop means fixed with said capsule and engaging said flange to limit contraction of said Sylphon.

5. The instrument of claim 4, said stop means comprising a tube fixed at one end to said rigid wall, about said opening therein, and extending freely about said stem and out of contact with said Sylphon, axially therethrough.

6. The instrument of claim 3, said indicator means also including an inverted cup-like indicator element having its base centrally attached to said stem exteriorly of said capsule.

7. The instrument of claim 1, said casing comprising, a base cup having a flanged rim, an inverted cap having a flanged rim, means connecting said rims together in a sealed joint, said capsule means comprising a base plate detachably secured to and within said base cup.

8. The instrument of claim 7, there being an aperture in said base plate through which said capsule may be pressurized, and means carried by said plate, closing and sealing said aperture.

9. The instrument of claim 7, at least a portion of the wall of said cap being transparent, said capsule means also comprising a cylindrical wall having one end secured to and closed by said base plate, and a rigid wall having an opening therein and secured to and closing the other end of said cylindrical wall, said cylindrical wall extending into said cap, said flexible wall portion comprising a Sylphon having one end secured to said rigid wall, about said opening, and depending within said cylindrical wall, means sealing the other end of said Sylphon, within said capsule means, said indicator means comprising a stem having one end fixed with the end of said Sylphon within said cylindrical wall and extending outwardly along said Sylphon to the exterior of said capsule means, and signal means fixed with the exterior end of said stem and viewable through the transparent wall portion of said cap.

10. The instrument of claim 9, said cap being of transparent material and having a central axis of symmetry, the surface of said cap being provided with a first set of opaque rings spaced along said axis by the width of the rings, said signal means comprising an inverted cup symmetrical about said axis and having a second set of rings spaced and having a width equal to the rings of said first set, each ring of said second set being concealed behind a ring of said first set, when said Sylphon is in a first position of extension, each ring of said second set being exposed between a respective contiguous pair of rings of said first set when said Sylphon is in a second position of extension, and means positively limiting the extension of said Sylphon between said first and second positions.

11. The instrument of claim 7, said base cup having a bore with one end closed and the other end opening outwardly of said cup, a conduit in said cup opening into said bore and in communication with said cap, a piston slidably fitting said bore and movable from a first position to a second position, at respective sides of said conduit opening in said bore, means integral with said cup for connecting the closed end of said bore with a pressurized system, means in said cup yieldingly urging said piston into first position, and means manually operable exteriorly of said cup, for moving said piston into second position against the urge of said yielding means.

12. An article of manufacture for use in a pressure-responsive instrument, a sealed self-contained capsule comprising first and second rigid end walls and a rigid cylindrical wall having its respective ends sealed to said end walls to form therewith a sealed pressurized chamber, said first wall having an opening therethrough, a resilient expansion device having one end sealed to said first wall about the opening therein, and extending into said chamber, means closing and sealing the end of said expansion device within said chamber, and indicator means fixed with the inner end of said expansion device within said chamber, and extending axially thereof through said opening to the exterior of the capsule.

13. The article of claim 12, said expansion device being a Sylphon, said indicator means comprising a stem fixed at one end with the inner end of said Sylphon and extending axially therethrough and outwardly through said opening, and stop means fixed with said capsule and positively limiting movement of the inner end of said Sylphon between first and second points spaced along the axis of said stem, said means closing the inner end of said Sylphon comprising a plate fixed with the end of said stem within said chamber, said stop means including a tube fixed at one end with said first wall, about said opening, and depending within said chamber, within said Sylphon and externally about said stem, said plate engaging the contiguous end of said tube to stop motion of said Sylphon at said first point, said plate engaging said second end wall to thereby determine said second point.

References Cited

UNITED STATES PATENTS

| | | | |
|---|---|---|---|
| 1,713,160 | 5/1929 | Auckland | 73—410 |
| 2,032,245 | 2/1936 | Wotring | 73—410 |
| 2,185,971 | 1/1940 | Achtel et al. | 73—410 |
| 2,502,776 | 4/1950 | Burdick | 73—410 |
| 2,638,786 | 5/1953 | Levitt et al. | 73—410 |
| 2,812,995 | 11/1957 | Morris | 73—410 |
| 2,903,888 | 9/1959 | Gfoll | 73—146.8 |
| 3,054,529 | 9/1962 | Billington | 116—132 |
| 3,055,219 | 9/1962 | Wilson et al. | 73—410 |
| 3,221,703 | 12/1965 | Kalustyan | 116—70 |

LOUIS J. CAPOZI, *Primary Examiner.*

U.S. Cl. X.R.

73—388; 170—160.22